United States Patent [19]

Brown

[11] Patent Number: 4,567,924

[45] Date of Patent: Feb. 4, 1986

[54] AIRCRAFT UNDER-WING FUELING NOZZLE SYSTEM

[76] Inventor: Albert W. Brown, 1207 Pembroke La., Newport Beach, Calif. 92660

[21] Appl. No.: 469,936

[22] Filed: Feb. 25, 1983

[51] Int. Cl.[4] .................... B67C 3/34; F16L 37/22
[52] U.S. Cl. ................................. 141/207; 141/346; 141/392; 137/797; 137/801; 137/802; 222/52; 222/63; 244/135 A; 244/135 R; 285/2; 285/3
[58] Field of Search ............. 141/198, 250–284, 141/206–229, 346–350, 392; 244/135 A, 135 R; 222/52, 63; 137/68 R, 801, 802, 797; 285/1, 2, 3, 4

[56] References Cited

U.S. PATENT DOCUMENTS

| | | | |
|---|---|---|---|
| Re. 16,708 | 8/1927 | Armstrong | 417/1 |
| 815,627 | 3/1906 | Oldham | 285/1 |
| 1,475,042 | 5/1949 | McCloskey | 287/53 |
| 1,778,576 | 10/1930 | Walker | 411/1 |
| 2,302,856 | 11/1942 | Harmon | 255/28 |
| 2,452,430 | 10/1948 | Clark et al. | 285/97.3 |
| 2,583,019 | 1/1952 | Saywell | 277/165 |
| 2,650,843 | 9/1953 | Spurgeon | 287/20 |
| 2,673,751 | 3/1954 | Finch | 285/175 |
| 2,679,407 | 5/1954 | Badger, Jr. | 284/18 |
| 3,060,978 | 10/1962 | Botkin | 141/128 |
| 3,061,336 | 10/1962 | Waggener | 285/84 |
| 3,168,125 | 2/1965 | Rosell | 141/346 |
| 3,170,748 | 2/1965 | Van Horssen | 339/88 |
| 3,190,322 | 6/1965 | Brown | 141/387 |
| 3,317,220 | 5/1967 | Bruning | 285/1 |
| 3,330,313 | 5/1967 | Rosell | 141/384 |
| 3,403,916 | 10/1968 | Durham et al. | 277/92 |
| 3,460,857 | 8/1969 | Larkin | 285/98 |
| 3,474,827 | 10/1969 | Rosell | 137/614.06 |
| 3,679,235 | 5/1972 | Faccou | 285/14 |
| 3,860,250 | 1/1975 | Lundquist | 277/165 |
| 4,020,910 | 5/1977 | Peterson et al. | 175/345 |
| 4,036,259 | 7/1977 | Wilder et al. | 285/1 |
| 4,105,046 | 8/1978 | Sturgis | 285/1 |
| 4,116,471 | 9/1978 | Duncan et al. | 285/1 |
| 4,124,228 | 11/1978 | Morrison | 285/1 |
| 4,181,149 | 1/1980 | Cox | 137/614.02 |
| 4,185,841 | 1/1980 | Brundage | 277/167.5 |
| 4,221,408 | 9/1980 | Lochte et al. | 285/276 |

FOREIGN PATENT DOCUMENTS 2051169 5/1978 Fed. Rep. of Germany .......... 285/1

Primary Examiner—Houston S. Bell, Jr.
Attorney, Agent, or Firm—Knobbe, Martens, Olson & Bear

[57] ABSTRACT

A modular nozzle system for refueling aircraft fuel tanks includes a nozzle valve linkage mechanism which permits the valve body to have a shorter length than previous designs. The nozzle may include a mechanical fuse for releasing the connection between the nozzle body and a fuel tank upon the application of predetermined forces. The nozzle may also include a swivel joint which facilitates positioning the nozzle for connection to a fuel tank. The nozzle may also include a quick disconnect assembly which facilitates connection of the nozzle to various hose end connection. The system also may comprise an assembly fixture for assembling the mechanical fuse and a test fixture for testing the release force of the mechanical fuse.

47 Claims, 23 Drawing Figures

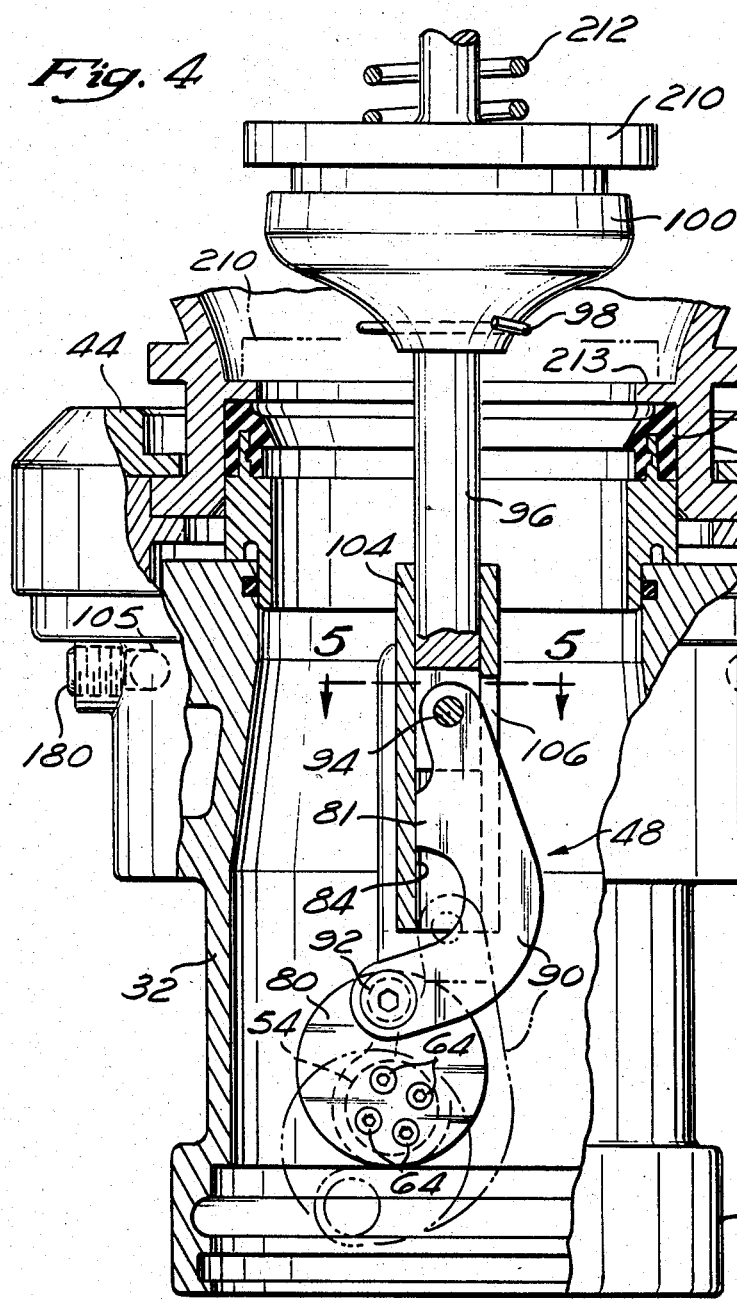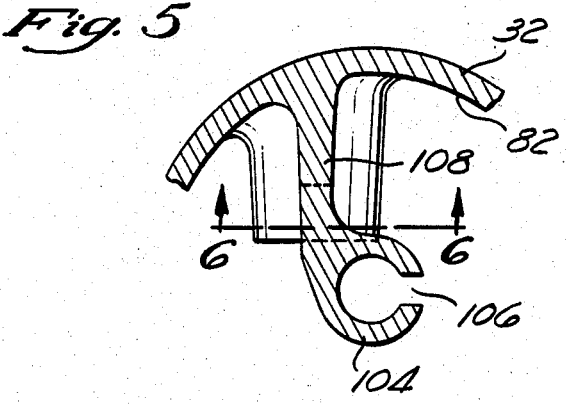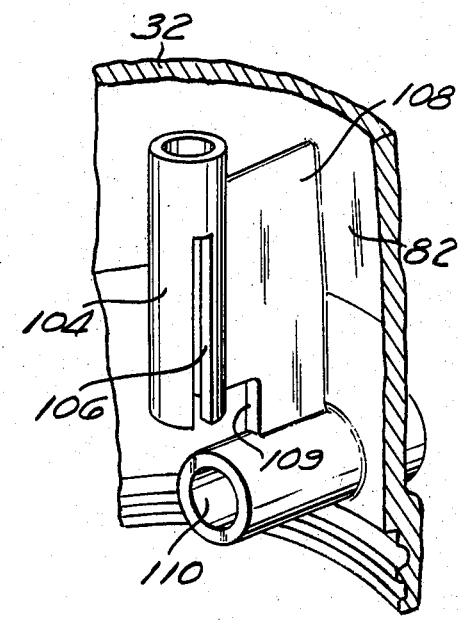

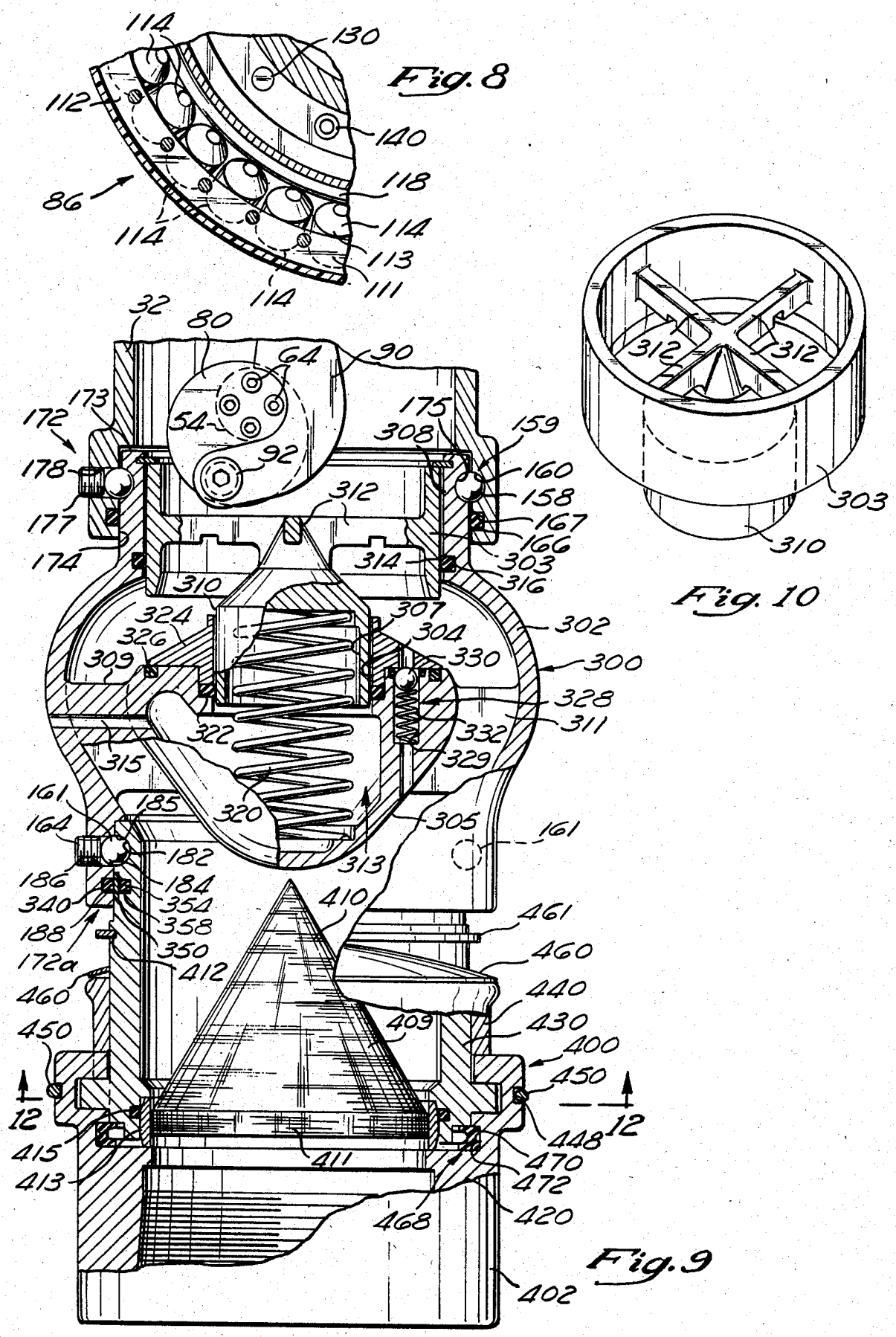

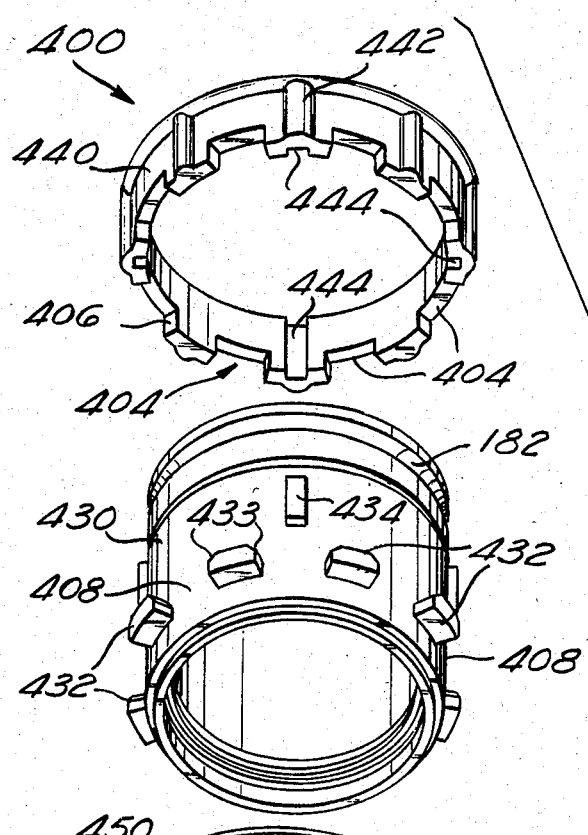
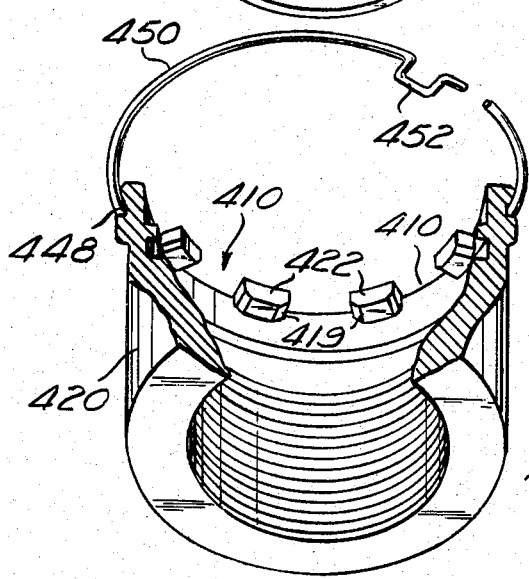
Fig. 11
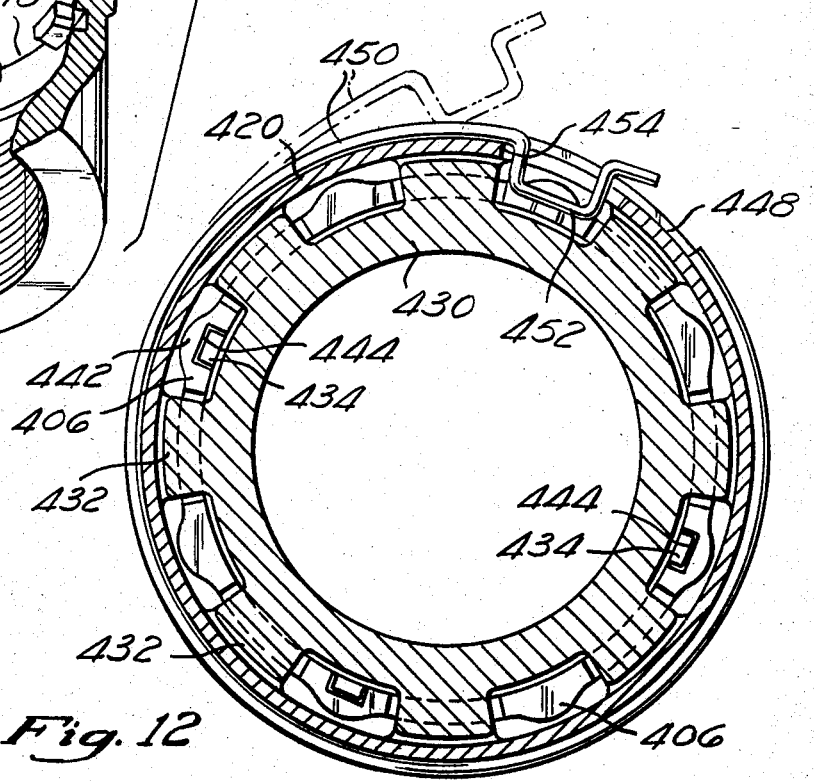
Fig. 12

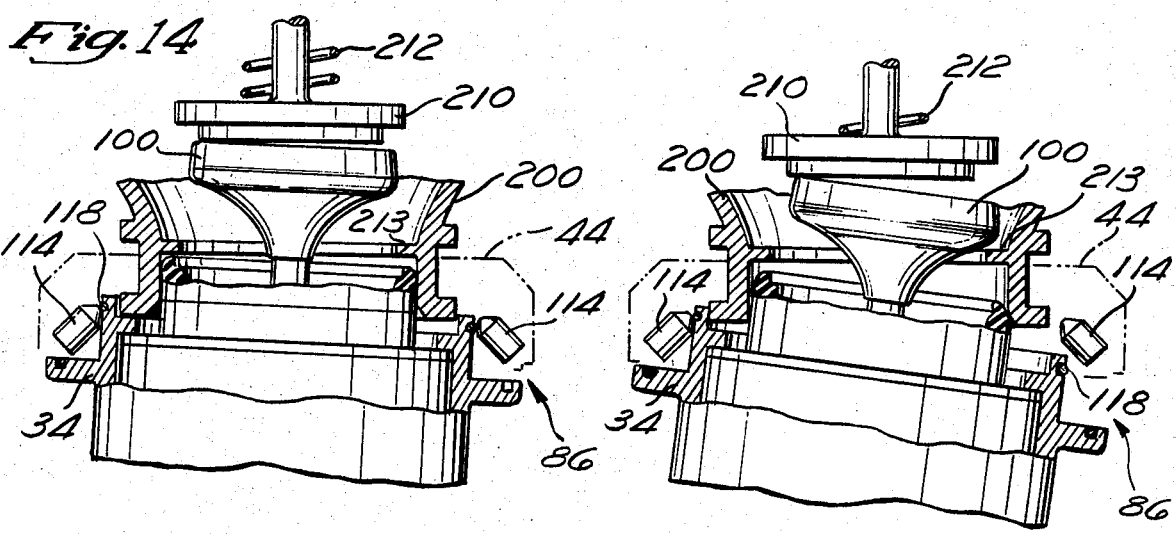
Fig. 14
Fig. 15
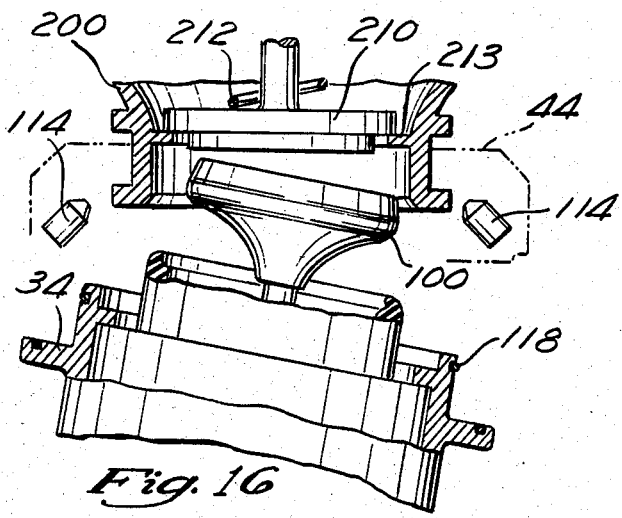
Fig. 16
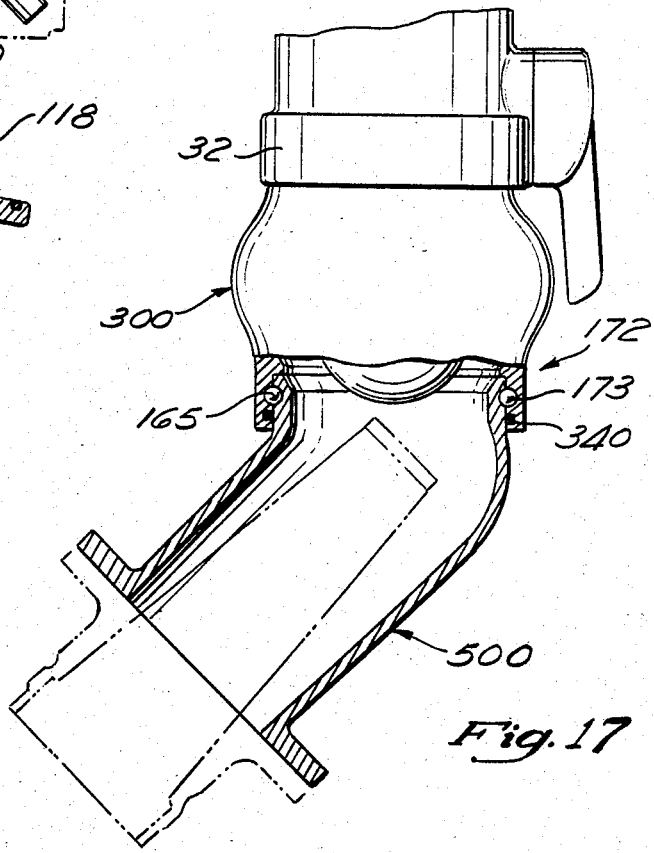
Fig. 17

AIRCRAFT UNDER-WING FUELING NOZZLE SYSTEM

BACKGROUND OF THE INVENTION

This invention relates generally to dry break disconnect couplings for the transfer of liquids and gases in applications where quick attachment and detachment are required without loss of the medium being transferred. More particularly, this invention relates to fueling nozzles and valves for supplying fuel to aircraft fuel tanks of the type having a refueling adapter accessible from below the wing of an aircraft. Still more particularly, this invention relates to jet aircraft refueling nozzles or couplings that connect to a standard refueling adapter generally mounted inside the lower wing surface of the aircraft. The invention also relates to couplings and nozzles which connect to a fuel source which is generally below the surface of the ground.

In aircraft refueling operations, it is desirable that the nozzle be light in weight and easy to handle because of the weight of the hose and typical distances from the refueling adapters to the ground. Most refueling nozzles presently in use are excessively heavy and long, which makes such nozzles difficult to handle and causes excessive loads on the aircraft adapter when the end of the nozzle farthest from the adapter is subjected to side loads.

Most prior art aircraft refueling nozzles have the additional disadvantage that it is difficult to radially position them for connection to the aircraft with and without fuel pressure in the fuel line connected to the refueling nozzle.

In a typical application, a service vehicle is connected to the refueling hose to pump fuel into the aircraft fuel tanks. If by mistake the refueling nozzle were left connected to the aircraft adapter and the operator of the service vehicle attempted to drive the service vehicle away from the aircraft, the nozzle would separate from the aircraft, generally causing damage to both the aircraft and the servicing equipment. Such incidents often damage the aircraft refueling adapter so severely that fuel spills result; and the aircraft is removed from service for costly, time-consuming repairs. Attempting to drive the service vehicle away while the refueling nozzle is connected to the aircraft also often damages the refueling nozzle, requiring replacement or repair at great expense and inconvenience.

Therefore, there is a need in the art for a relatively short, lightweight aircraft refueling nozzle, which includes a mechanical fuse which causes the nozzle to break away from the aircraft refueling adapter upon the application of predetermined axial loads and side loads, which is easy to position with pressure in the line for connection to the aircraft and which is easy to reassemble after a separation of the mechanical fuse occurs and which in addition provides convenient modular accessories.

SUMMARY OF THE INVENTION

Accordingly, the present invention overcomes the disadvantages of prior art aircraft refueling nozzles. The present invention includes structure for controlling the axial position of the refueling valve to permit the construction of an aircraft refueling nozzle considerably shorter in length than most previous aircraft refueling nozzles. The invention further includes an easily rotatable swivel which permits easy radial positioning of the nozzle for connection to an aircraft adapter with or without pressure in the fuel line connected to the nozzle. The aircraft refueling nozzle according to the invention may include a mechanical fuse which is nonfatiguing, permanently lubricated and sealed, nonadjustable repeatably testable for break-away force calibration, and easy to reassemble for reuse after a separation occurs. The invention further includes a test unit for verifying that the refueling nozzle operates with predetermined side and longitudinal break-away forces. The nozzle may include a quick disconnect assembly which permits easy attachment and detachment from different types of hose end connectors to provide a modular structure for receiving modular accessories, such as pressure regulators or dry-break hose end connectors.

BRIEF DESCRIPTION OF THE DRAWINGS

FIG. 4 is a partial cross-sectional view taken along line 4—4 of FIG. 2;

FIG. 5 is a cross-sectional view taken along line 5—5 of FIG. 4;

FIG. 6 is a cross-sectional view taken along line 6—6 of FIG. 5;

FIG. 7 is a perspective view of the nozzle poppet shaft bearing of FIGS. 3 and 4;

FIG. 8 is a cross-sectional view taken along line 8—8 of FIG. 3;

FIG. 9 is a cross-sectional view showing a portion of a refueling nozzle, a pressure regulator, a quick disconnect assembly and screen assembly;

FIG. 10 is a perspective view of the pressure regulator integral piston and valve of FIG. 9;

FIG. 11 is an exploded view showing details of the disconnect assembly of FIG. 9;

FIG. 12 is a cross-sectional view showing two locking mechanisms for the quick disconnect assembly of FIG. 9 with a wire tang both locked and unlocked;

FIGS. 14–16 are cross-sectional views showing the effects of side loads on a refueling nozzle according to the invention;

FIG. 17 illustrates a modular pressure regulator attached to a nozzle body and a swiveling, angled fuel inlet flanged to accept the military-type disconnect and screen assembly;

DESCRIPTION OF THE PREFERRED EMBODIMENT

Figure 1:
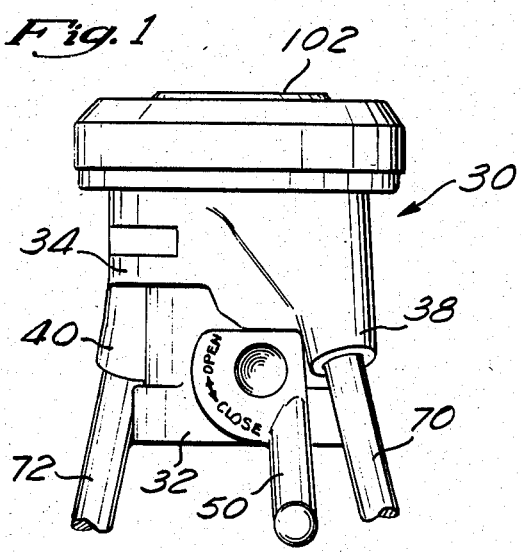
FIG. 1 is an elevation view of the refueling nozzle according to the invention with the nozzle poppet valve in the closed position.
Figure 2:
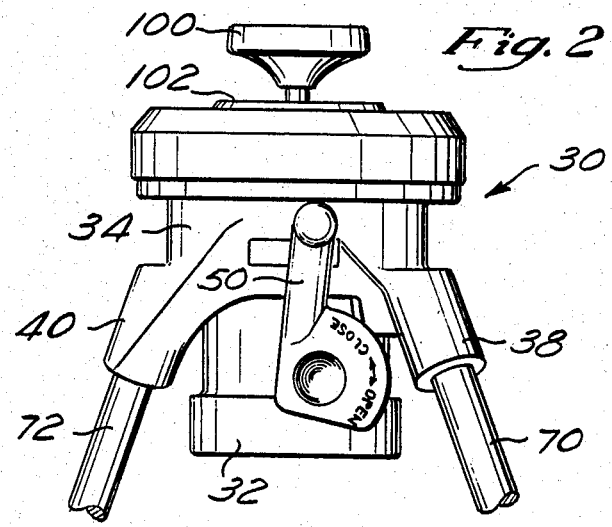
FIG. 2 is an elevation view of an aircraft refueling nozzle similar to that shown in FIG. 1 with the nozzle poppet valve in the open position.

Referring to FIGS. 1 and 2, a fueling nozzle 30 includes a nozzle body 32, which may have a generally cylindrical configuration, a nozzle collar 34, and a valve such as nozzle poppet valve 100. FIG. 1 shows the poppet valve 100 in the closed position, and FIG. 2 shows the poppet valve 100 in the open position. The nozzle collar 34 includes a pair of nozzle collar handle receivers 38 and 40 for connecting a pair of handles 70 and 72, respectively, to the nozzle collar 34. The nozzle collar 34 is preferably formed of cast aluminum and the handles 70 and 72 are preferably formed of wrought aluminum. The handles 70 and 72 cooperate with the handle receivers 38 and 40, respectively, to provide durability and to eliminate the machining steps which would be necessary to assemble the nozzle 30 with separate handles. A crank handle 50 for controlling the position of the poppet valve 100 extends from the nozzle body 32.

Figure 3:
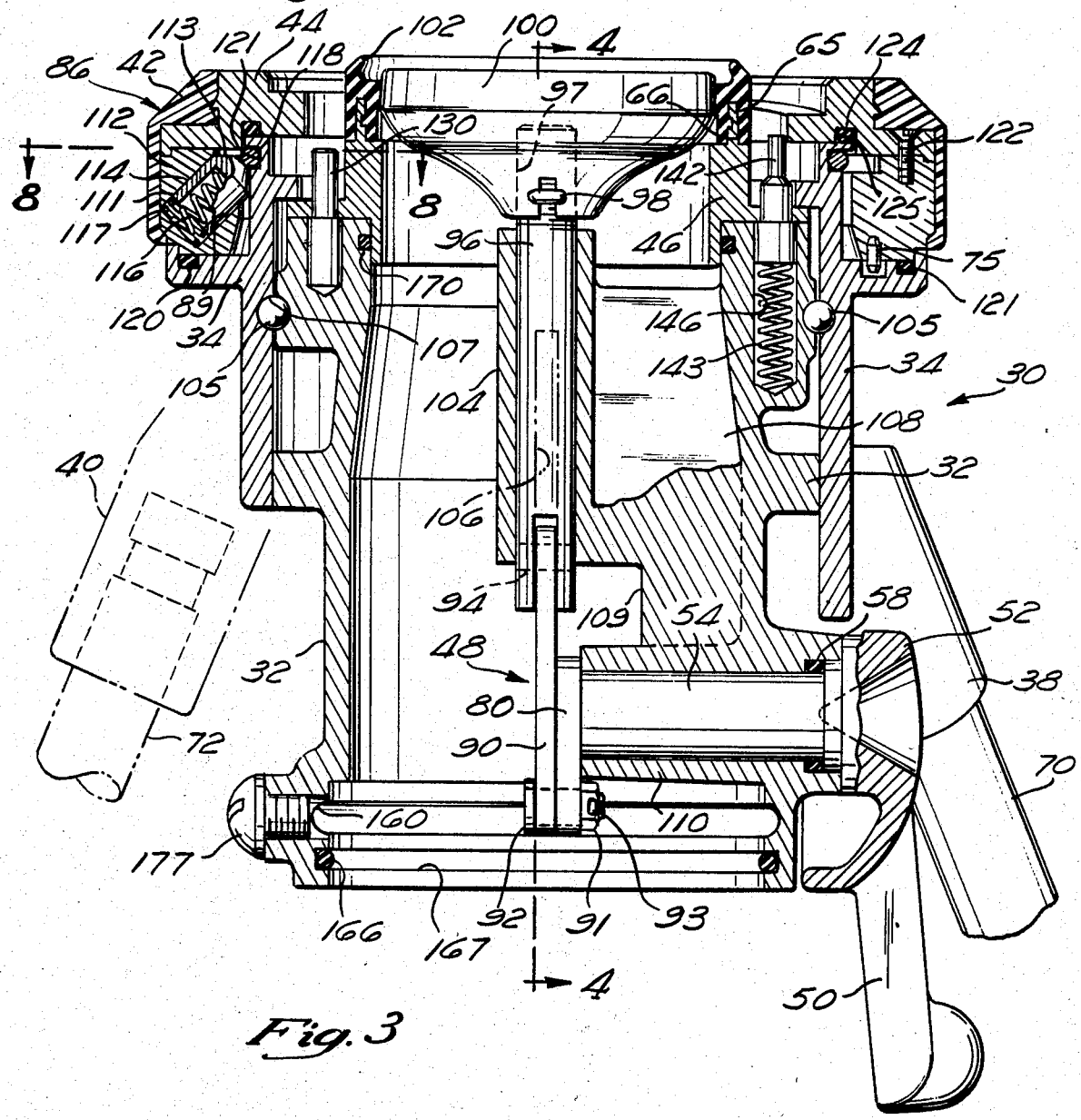
FIG. 3 is a partial cross-sectional view of a refueling nozzle according to the invention.

Referring to FIG. 3, a poppet seal 102 engages the poppet valve 100 when the poppet valve 100 is closed to prevent fuel leakage. A seal support 46, preferably formed of a suitable metal, has a projection 65 embedded and bonded in a cavity 66 in the poppet seal 102. The seal support 46 engages a seal 170 which prevents fuel leakage out of the nozzle body 32.

FIGS. 3-7 illustrate a linkage 48 for controlling axial movement of the nozzle poppet valve 100. A support web 108 extending from an inner wall portion 82, best shown in FIGS. 5 and 7, of the nozzle body 32 has formed at its inner end a nozzle poppet bearing 104, which is preferably a sleeve bearing, in axial alignment with the nozzle body 32. A nozzle poppet shaft 96 projects through the nozzle poppet bearing 104 into a threaded engagement recess 97 in the lower portion of the nozzle poppet valve 100. A cotter pin 98 locks the nozzle poppet shaft 96 to the nozzle poppet valve 100.

As shown in FIG. 3, a crank handle shaft 54 extends from the crank handle 50 through a crank handle shaft guide 110 formed in the lower portion of the support web 108. Suitable sealing means, such as an O-ring 58 prevents leakage of fuel between the crank handle shaft 54 and the crank handle shaft guide 110.

Referring to FIG. 4, connecting means, such a as plurality of bolts 64, connects the crank handle shaft 54 to an eccentric link. A bolt 92 preferably, preferably threaded into the eccentric link 80 and locked by a lock nut 91 and cotter pin 93 connects the eccentric link 80 to the connecting link 90 to connect the eccentric link 80 to the nozzle poppet shaft 96. A notch 109 (FIG. 4) in the support web 108 permits the lock nut 91 to move without obstruction as the eccentric link 80 rotates. A pin 94 connects the connecting link 90 to the nozzle poppet shaft 96.

Referring to FIGS. 3-7, a slot 106 in the nozzle poppet shaft bearing 104 permits the connecting link 90 to nest within the nozzle poppet shaft bearing 104 as the nozzle poppet valve 100 moves from the closed position to the open position. FIG. 3 shows the nozzle poppet valve 100 in a closed position in which the nozzle poppet valve 100 sealingly engages the nozzle poppet valve seal 102. Rotation of the crank handle shaft 54 rotates the eccentric link 80 counter clockwise as seen in FIG. 4 to move the nozzle poppet valve 100 to an open position. Such rotation of the eccentric link 80 lifts the connecting link 90, which exerts an axial force on the nozzle poppet shaft 96 to lift the nozzle poppet valve 100 and release the seal between the nozzle poppet valve 100 and the nozzle poppet seal 102. The crank link 90 moves into the slot 106, best shown in FIGS. 4, 5 and 7, as the eccentric link 80 rotates to advance the nozzle poppet valve 100 away from the nozzle poppet seal 102. As the connecting link 90 raises, it rotates about the pin 94 and the pin 92 to accommodate the movement. The rotation of the connecting link 90 about the pin 94 is counter clockwise, as viewed in FIG. 4, during initial movement; and then the rotation reverses to clockwise as the pin 92 goes counter clockwise past the vertical center line of the eccentric link 80. A pad 81 projects from the crank link 90 to provide means for limiting the clockwise movement of the crank link 90 and the nozzle poppet shaft 96 within the nozzle poppet shaft bearing 104. After the pad 81 contacts a stop 84 on the nozzle poppet shaft bearing 104, no further clockwise rotation of the crank link 90 about the pin 94 is possible.

Since the connecting link 90 moves within the slot 106 in the nozzle poppet shaft bearing 104 while controlling the position of the nozzle poppet valve 100, the nozzle poppet body 32 may be made shorter in length than would otherwise be possible. The nozzle poppet shaft bearing 104 must have a length adequate to provide a sufficient bearing surface and to maintain the nozzle poppet shaft 96 and the nozzle poppet valve 100 in proper alignment within the nozzle body 32. Without the slot 106 in the nozzle poppet shaft bearing 104, the crank handle shaft 54 would have to be mounted to an eccentric link at a distance from the lower end of the nozzle poppet shaft bearing sufficient to permit the range of reciprocal movement of the connecting link necessary for opening and closing the nozzle poppet 100 valve.

Figure 13:
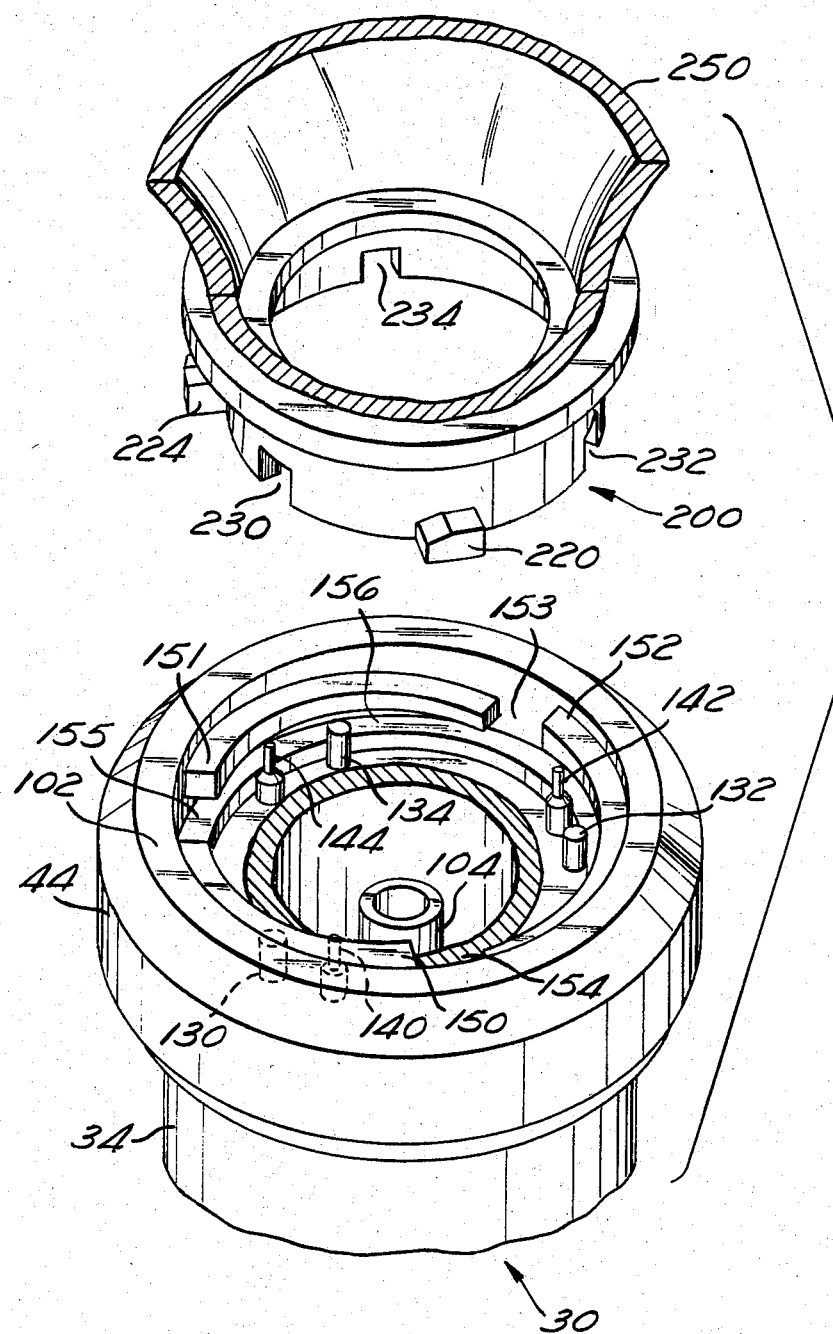
FIG. 13 is an exploded perspective view of the upper portion of the refueling nozzle positioned for connection to an aircraft refueling adapter.

Referring to FIGS. 4 and 13, in normal use a nozzle collar adapter 44 connected to the nozzle collar 34 of the nozzle 30 is connected to an aircraft adapter 200.

FIG. 13 illustrates the connection of the nozzle 30 to an aircraft fuel tank 250. The aircraft adapter 200 extends from the aircraft fuel tank 250 and includes a plurality of locking lugs such as lugs 220 and 224 and a plurality of indexing notches 230, 232 and 234.

The nozzle body 32 includes a plurality of upstanding indexing pins 130, 132 and 134 sized and spaced to fit into the indexing notches 230, 232 and 234. Three arcuately spaced locking shelves 150, 151 and 152 formed on the inner wall of the nozzle collar adapter 44 define a plurality of locking slots 153, 153 and 155 spaced to receive the locking lugs 220 and 224.

The nozzle collar 34 is rotatably mounted upon the nozzle body 32 so that the locking lugs 220 and 224 may be engaged in the locking slots 153, 154 and 155. As shown in FIG. 13 the locking shelves 150, 151 and 152 are inclined helically. A lower shelf 156 on the nozzle collar adapter 44 below the locking shelves is nonhelical.

To connect the nozzle 30 to the aircraft fuel tank 250 an operator aligns the indexing notches 230, 232 and 234 with the indexing pins 130, 132 and 134 on the nozzle body 32, and positions the locking lugs 220, 222 and 224 within the locking slots 153, 154 and 155. As shown in FIG. 13, a counter-clockwise rotation of the nozzle collar adapter 44 relative to the aircraft adapter 200 causes the locking lugs 220 and 224 to advance between the helical locking shelves 150, 151 and 152 and the lower shelf 156 to sealingly engage and lock the nozzle seal 102 to the aircraft adapter 200.

Referring to FIG. 16, the aircraft adapter 200 includes an aircraft adapter poppet which is urged toward a closed position by a spring 212 to seal against an annular shoulder 213 formed in the aircraft adapter 200.

Rotation of the crank handle 50 to turn the crank handle shaft 54 in a counter clockwise direction as shown in FIG. 4 moves the nozzle poppet valve 100 to the open position and opens the aircraft adapter poppet 210 to permit introduction of fuel into the aircraft fuel tank 250.

Referring to FIG. 4, when the nozzle poppet valve 100 is fully open, the pad 81 contacts the stop 84 on the nozzle poppet shaft bearing 104 to prevent further counter-clockwise rotation of the crank handle shaft 54. After the connecting link 90 has gone over center, the force of the aircraft adapter spring 212 against the nozzle poppet valve 100 tends to force the pad 81 against the stop 84, holding the poppet valves 100 and 210 open. Therefore, the nozzle poppet valve 100 remains in the open position as shown in FIG. 4 until a clockwise rotation of the crank handle shaft 54 causes movement of the crank link 90 to move the pad 81 away from the stop 84 to move the poppet valve 100 toward the closed position.

When the nozzle poppet valve 100 is in the closed position, the connecting link 90 and eccentric link 80 are in the position shown in phantom in FIG. 4. The pin 92 is again in an over-center position relative to the eccentric link 80. An upward force, such as from internal fueld pressure in the nozzle body 32, tending to open the nozzle poppet valve 100 tends to lift the crank link 90, which tends to rotate the crank shaft 54 clockwise because of the over-center position of the pin 92. This drives the connecting link 90 against the head of one of the bolts 64, which acts as a stop to prevent movement of the crank link 90, and thereby prevent unwanted opening of the poppet value 100.

Referring to FIG. 3, the nozzle collar adapter 44 and the nozzle collar 34 are separate pieces. The nozzle collar 34 is rotatable about the nozzle body 32 on a plurality of ball bearings 105 mounted in a corresponding cavity 107 formed between the nozzle body 32 and the nozzle collar 34.

As shown in FIGS. 3, 8 and 14-16, the fueling nozzle 30 may include a mechanical fuse 86 which permits separation of the nozzle collar 34 and the nozzle collar adapter 44 upon the application of predetermined loads. The mechanical fuse 86 comprises a plurality of spring-biased detents 114 around the outside diameter of the nozzle collar 34. A preferred embodiment of the mechanical fuse 86 includes thirty-six substantially identical detents 114.

Each detent 114 is positioned in a corresponding generally cylindrical cavity 89 in a detent ring 112 which fits between the nozzle collar adapter 44, the nozzle collar 34 and a collar bumper 42. The detent ring 112 is affixed to the nozzle collar adapter 44 by any suitable means such as a plurality of screws 122. The geometry of the connection between the detent ring 112 and the nozzle collar adapter 44 ensures that the detents 114 remain with the nozzle collar adapter 44 after the mechanical fuse 86 functions to separate the nozzle collar adapter 44 and the nozzle collar 34. The cavities 89 are arcuately spaced about the circumference of the nozzle collar 34 as shown in FIGS. 3 and 8. In a preferred embodiment of the invention, the longitudinal axis of each cavity 89 makes an angle of 45° with the centerline of the nozzle body 34.

Referring to FIG. 3, each detent 114 preferably includes an inner detent spring 116 and an outer detent spring 117, which is preferably concentric with the inner detent spring 116. As shown in FIGS. 3 and 8 each detent 114 has a generally cylindrical lower portion 111 and a frusto-conical upper portion having a chamfered surface 113. The frusto-conical upper portions of the detents 114 project from the cavities 89 to bear against retainer means such as a hardened steel wire 118 imbedded in an annular groove 121 in the nozzle collar 34.

The geometry of the relationship between the detents 114 and the wire 118 is such that normally all of the detents 114 are always bearing against the wire 118 to create a tight clamping force to retain the nozzle collar adapter 44 on the nozzle collar 34. It is preferable that the detents 114 bear only against the wire 118 and not against the outside diameter of the nozzle collar 34. In a preferred embodiment the chamfered surfaces 113 make angles of 45° with the longitudinal axes of the detents 114.

Referring to FIGS. 3, 8 and 13, the nozzle collar 34 includes a plurality of collar lock pins 140, 142 and 144, which index the nozzle collar 34 and the nozzle body 32 to prevent relative rotation prior to connection of the nozzle 30 to the aircraft adapter 200. As shown in FIG. 3, the collar lock pin 142 is mounted in a cavity 146 in the nozzle body 32. A collar lock pin spring 143 mounted within the cavity 146 below the collar lock pin 142 permits movement of the collar lock pin 142 within the cavity 146. The remaining collar lock pins 140 and 144 are mounted in the nozzle collar 34 in the same manner as is the collar lock pin 142. The collar lock pins 140, 142 and 144 are forced into the nozzle body 32 when the aircraft adapter 200, shown in FIG. 13, is connected to the nozzle collar adapter 44 to allow the nozzle collar 34 to rotate relative to the nozzle 32.

The detents 114 and the wire 118 permit predictable separation of the nozzle collar 34 and the nozzle collar adapter 44 upon the application of a predetermined axial load or a predetermined side load, or bending couple, to the nozzle 32. FIGS. 14-16 illustrate separation of the nozzle collar adapter 44 from the nozzle collar 34 in response to a side load. In functioning as a mechanical fuse mechanism, the detents 114 ride over the wire 118 by compressing the inner and outer detent springs 116 and 117, respectively, shown in FIG. 3, to allow separation of the nozzle collar 34 and the nozzle collar adapter 44 upon the application of predetermined loads. Controlling the positions of the detents 114 on the wire 118 and choosing the detent inner spring 116 and the detent outer spring 117 to have selected force constants controls the break-away force of the mechanical fuse 86.

Referring to FIG. 3, in order to ensure repeatable break-away forces, the mechanical fuse 86 is encapsulated between a pair of O-ring seals 120 and 124 and packed with a suitable lubricant. The O-ring 120 is in an annular groove 121 in the nozzle collar 34, and the O-ring 124 is in an annular groove 125 in the locking flange 44.

After a breakaway, the nozzle collar adapter 44 remains connected to the aircraft adapter 200.

FIG. 14 shows one of the detents 114 beginning to ride above the wire 118 in response to a side load applied to cause a clockwise rotation of the nozzle collar 34. FIG. 15 shows the detent 114 being retained within the nozzle collar adapter 44 after the detent 114 has become disengaged with the wire 118.

As shown in FIG. 16, while the nozzle collar adapter 44 is separated from the nozzle collar 34, the detents 114 are retained within the collar adapter 44. The nozzle poppet 100 remains with the nozzle body 32 and withdraws from the aircraft adapter 200. If the nozzle poppet valve 100 is in the open position when separation occurs, the aircraft adapter poppet valve 210 then closes against the aircraft adapter 200 to minimize fuel spillage from the aircraft fuel tank 250.

Since each detent 114 has a flat end face inclined relative to the longitudinal axis of the nozzle 30, release of the mechanical fuse 86 requires a progressively greater force to compress the inner and outer detent springs 116 and 117, respectively, so that the detents 114 will ride over the wire 118. The force constants of the springs 116 and 117 are chosen such that a predetermined load causes the detents 114 to slide over the wire 118 as progressively greater loads are applied to compress the detent springs 116 and 117. At the predetermined release force the flat end face of one of the detents 114 slides off the wire 118, which is then in contact with the chamfer 113 on the face of the detent 114. The angles of the chamfers 113 are chosen such that the chamfers 113 slide over the wire 118 to offer little resistance to axial movement of the nozzle collar adapter 44 relative to the nozzle collar 34. The structure of the mechanical fuse 86 results in a gradual, controlled separation of the nozzle collar adapter 44 and the nozzle collar 34 until application of the predetermined release force to the mechanical fuse 86, at which time the mechanical fuse 86 rapidly releases.

Referring to FIG. 3, the detents 114 are contoured at a shape desirable for producing the selected force-stroke profile for separation. Within the specified required diametral restrictions, the hollow cylindrical design of the detents 114 accommodates longer detent springs 116, 117 than is possible with a conventional ball detent design (not shown). The 45° angles of the cavities 89 controls side loaded friction variations of the detents 114 against the walls of the cavities 89. The chamfer 113 on the faces of the detents 114 allows the accomplishment of a controlled separation test without complete disengagement and permits resetting of the detents 114 on the wire 118.

An additional feature of the mechanical fuse 86 is that the release force may be adjusted by using wires 118 of various diameters, thereby adjusting the force required to compress the detents 114.

Assembly of the mechanical fuse 86 or resetting thereof to render the nozzle 30 servicable after a release requires several sequential steps. The detent ring 112 with springs 116, 117 and detents 114 inserted but disassembled from the nozzle collar adapter 44 is connected to the nozzle collar 34 by simultaneous compression of all the detent springs 116, 117 to move the detents 114 outward past the outside diameter of the wire 118 and then installing the nozzle collar adapter 44 on the nozzle collar 34 and permitting the springs 116, 117 to expand to cause the detents 114 exert a clamping force on the wire 118. An indexing pin 75 (FIG. 3) having tapered ends guides the detent ring 112 into position on the nozzle collar 34.

Figure 22:
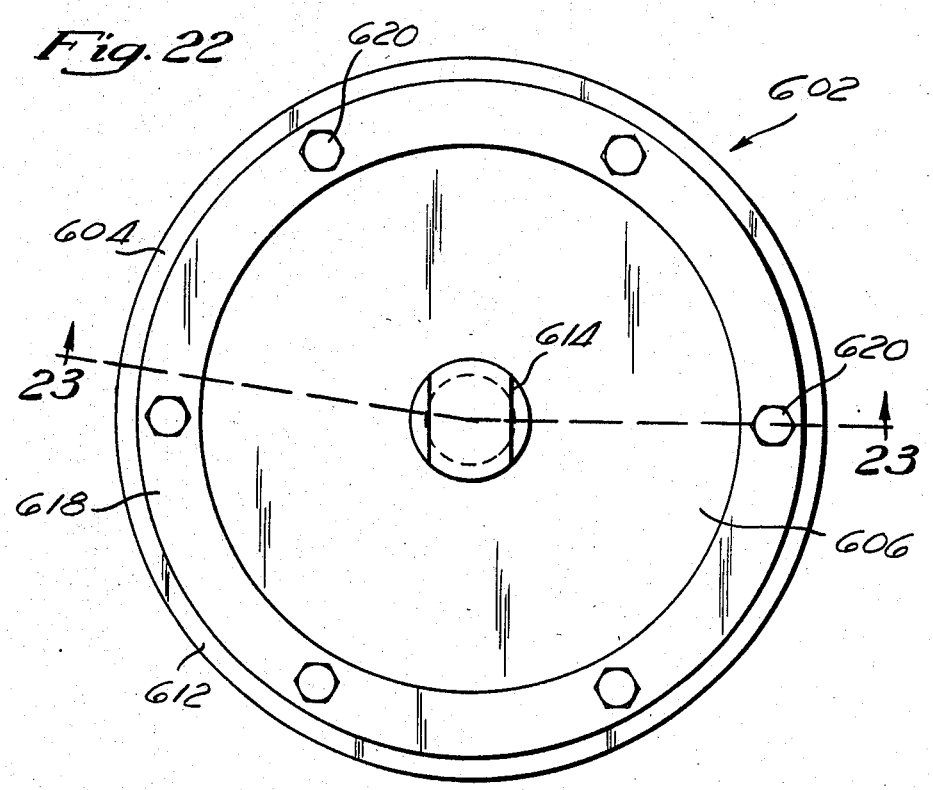
FIG. 22 is a plan view of an assembly fixture for assembling a mechanical fuse according to the invention.
Figure 23:
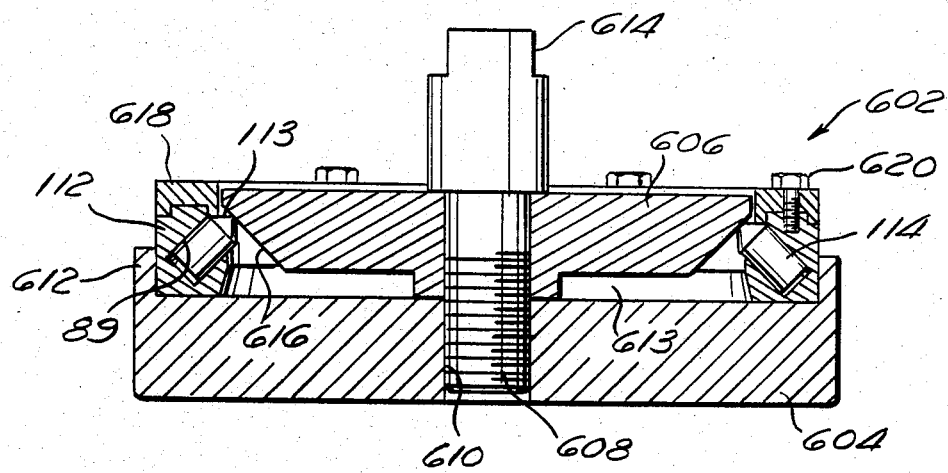
FIG. 23 is a cross-sectional view taken along line 23—23 of FIG. 22.

FIGS. 22 and 23 show the structure of an assembly fixture 602 which provides means for quickly and easily assembling the detenting 112 and the detents 114 onto the nozzle collar 34. The assembly fixture 602 includes a base 604, a detent washer 606 and a bolt 608. The base 604 has a threaded bore 610 sized to engage the bolt 608, which is inserted through the detent washer 606 into the bore 610. The base 604 is generally discoid with a circular lip 612 entending from an end face thereof.

The circular lip 612 forms a cavity 613 having dimensions appropriate for closely fitting around the detent ring 112 to hold the detent ring 112 for compression of the detents 114 into the cavities 89. The bolt 608 has a head 614 which may be turned with a wrench (not shown) to urge the detent washer 606 against the detents 114. The detent washer has a chamfered surface 616, which is in contact with the ends of the detents 114. Threading the bolt 608 into the bore 610 draws the detent washer 606 closer to the base 604 and slides the detents 114 along the chamfered surface 616, thereby compressing the detents.

After the detents 114 are sufficiently compressed, a retainer ring 618 is connected to the detent ring 112 by any suitable means such as a screw 620. In actual practice a plurality of screws 620 may be used to secure the retainer ring 618 to the detent ring 112. A preferred embodiment has six screws 620 arcuately spaced at 60° angles along the retainer ring 618. The retainer ring 618 fits over the chamfered surfaces 113 of the detents 114 as shown in FIG. 22 to retain the detents 114 within the cavities 89 after the compressive force of the detent washer 606 is released from the detents 114.

After the retainer ring 618 is secured to the detent ring 112, the bolt 608 is unthreaded from the base 604 so that the detent ring 112 may be placed over the nozzle collar 34 in the position shown in FIG. 3. Assembly of the mechanical fuse 89 is completed by removing the screws 620 from the detent ring 112 to allow the detents 114 to move out of the cavities 89 a distance sufficient to press the ends of the detents 114 against the wire 118. The nozzle collar adapter 44 is attached to the detent ring 112 by a plurality of screws 122, best shown in FIG. 3.

Referring to FIG. 9, the nozzle 30 may include a pressure regulator 300 which includes a regulator housing 302, disposed upstream from the nozzle body 32. A swiveling assembly joint 172 connects the regulator housing 302 between the nozzle body 32 and an upper disconnect half 430 of a quick disconnect assembly 400. The regulator housing 302 includes a male end 173 which projects into a female recess 174 in the nozzle body 32. The male end 173 of the regulator housing 302 includes a semi-circular annular groove 175; and the female recess 174 in the nozzle body 32 includes a corresponding semi-circular groove 160 which aligns with the semi-circular groove 175 to form a ball race 159 when the swivel joint 172 is assembled. A passage 178 extends through the wall of the nozzle body 32 into the semi-circular annular groove 160 so that a plurality of ball bearings 158 may be inserted into the ball race 159 formed when the semi-circular annular groove 175 and 160 are in alignment as shown in FIG. 9. To achieve a low coefficient of friction, the balls 158 are free rolling; and a seal 166 inside an annular groove 167 in the nozzle body 32 permanently protects the balls 158 from outside contamination. A plug 177 seals the passage 178 to retain the balls 158 within the ball race 159.

The swivel joint assembly further includes a second swivel joint 172a, which includes a semi-circular annular groove 182 in the upper disconnect half 430 of the quick disconnect assembly 400 and a corresponding semi-circular annular groove 184 in the lower portion of the regulator housing 302 as shown in FIG. 9. The semi-circular annular grooves 182 and 184 cooperate to form a ball race 185 in a manner similar to that in which the semi-circular annular grooves 175 and 160 cooperate to form the ball race 159. A passage 186 extends through the regulator housing 302 into the ball race 185 so that a plurality of ball bearings 161 may be inserted therein. A plug 164 retains the ball bearings 161 in the ball race 185. The O-ring 340 is preferably formed of a low friction substance such as polyurethane to further reduce rotational frictional forces in the quick disconnect assembly 400 and the swivel joint 172. The outer surface of the male disconnect housing 430 under the ring 340 incorporates a teflon slipper seal 350 positioned between a pair of O-rings 340 and 354 mounted in grooves 188 and 358, respectively, to provide low rotational sliding friction upon action of the swivel assembly. The teflon slipper seal 350 is free to rotate and slide against the inner O-ring 354. The swivel joint 172a is substantially identical to the primary swivel joint 172 in the upper disconnect half 430 of the quick disconnect assembly 400 and preserves the modular interchangeability of accessories to the advantage of weight and economy of construction.

Referring to FIGS. 9 and 11, the quick disconnect assembly 400 includes a lower disconnect half 420 which mates with the upper disconnect half 430. The lower disconnect half is typically formed on one end of a straight pipe thread 402 as shown in FIG. 9. The pipe threads may be of various sizes and are ordinarily connected to fuel delivery hoses (not shown) of various sizes and types.

Referring to FIG. 11, the upper disconnect half 430 includes a plurality of lugs 432 projecting radially outward therefrom, and the lower disconnect half 420 includes a plurality of mating lugs 422 projecting radially inward. Connecting the upper disconnect half 430 to the lower disconnect half 420 requires axial movement of the upper disconnect half 430 relative to the lower disconnect half 420 so that the lugs 432 penetrate inside the lower disconnect half 420 between the mating lugs 422. After the lugs 432 are inserted in the lower disconnect half 420, relative rotation of the upper disconnect half 430 and the lower disconnect half 420 to align the lugs 432 with the mating lugs 422 connects the upper disconnect half 432 to the lower disconnect half 420. As shown in FIG. 11, each of the lugs 432 preferably is cast with a pair of ramps 433 thereon; and similarly each of the lugs 423 includes a pair of ramps 419. The ramps 419 and 433 facilitate engagement of the lugs 432 and 422, respectively, to securely connect the upper and lower disconnect halves 430 and 420, respectively, without the need for machining operations other than using a lathe to form the ramps 419 and 433.

The upper and lower disconnect halves 430 and 420, respectively, include no stops to limit rotational movement of the lugs 432 relative to the lugs 422. Therefore, the upper disconnect half 430 may be connected or disconnected to the lower disconnect half by rotation of the upper and lower disconnect halves 430 and 420, respectively in either direction in any of the eight indexing positions. As may be seen from FIG. 11, a slight rotation is sufficient to align the lugs 432 and the mating lugs 422, which is advantageous for ease of operation in applications which require axial force as well as rotation for assembly.

In order to prevent inadvertent disconnects, the quick disconnect assembly 400 includes a castellated sleeve 440 which retains the upper and lower disconnect halves 430 and 420, respectively, against relative rotation. The castellated sleeve 440 is slidably mounted over the upper disconnect half 430. The castellated sleeve 440 includes a plurality of radial slots 404 separated by a plurality of retaining lugs 406 and 442. The upper disconnect half 430 includes a plurality of indexing ribs 434 extending from the outer circumference thereof. The retaining lugs 442 each include an indexing slot 444 in which the indexing ribs 434 slide when the quick disconnect assembly is assembled.

Referring to FIG. 11, when the lugs 432 and the mating lugs 422 are in alignment to lock the upper and lower disconnect halves 430, 420, respectively, together, the castellated sleeve 440 is axially slidable along the upper disconnect half 430 so that the retaining lugs 406 and 442 fit into a plurality of slots 408 and 410 between the lugs 432 and the mating lugs 422, respectively. The lugs 432 and mating lugs 422 fit inside the radial slots 404 of the castellated sleeve 440. The retaining lugs 406 and 442, the radial slots 404, the lugs 432, the mating lugs 420, and the slots 408 and 410 therefore cooperate to provide means for retaining the upper and lower disconnect halves 430 and 420, respectively against relative rotation.

FIGS. 9 and 12 show the castellated sleeve 440 in a locked position. Referring to FIG. 9, a circular stamped spring 460 retained a snap ring 461 in a groove 412 on the outer circumference of the upper disconnect half 430 holds the castellated sleeve 440 in position to retain the upper and lower disconnect halves 430 and 420, respectively, against relative rotation. Referring again to FIGS. 9, 11, and 12, a second locking device is embodied in a spring wire 450 which is mounted within a groove 448 in the lower disconnect half 420. The spring wire 450 has a tang 452 which extends radially inward through a slot 454 in the groove 448 through the lower disconnect portion 420. The tang 452 engages the male disconnect half 430 between the lugs 432 to prevent relative rotation between the upper and lower disconnect halves 430 and 420, respectively.

In order to release the quick disconnect assembly, an operator lifts the tang 452 from the slot and slides the wire 450 in the groove 448 so that the tang 452 is disengaged from the male disconnect half 430 as shown in FIG. 12. Next, the sleeve 440 is moved against the spring 460 out of engagement with the lugs 454. The operator may easily rotate the upper disconnect half 430 so that the lugs 432 are in alignment with the slots 410 between the mating lugs 422 of the female disconnect half 420, which permits relative axial movement of the upper and lower disconnect halves 430 and 420, respectively. A significant advantage of the swivel connection assembly 172 and the quick disconnect assembly 400 is that no tools are required to lock or unlock the quick disonnect assembly 400. A further advantage of the quick disconnect assembly are that there are no loose parts which could be misplaced while an operator is connecting or disconnecting the quick disconnect assembly 400. Still another advantage of the quick disconnect assembly is that the castellated sleeve 440 may conveniently be formed of injection molded plastic or die cast aluminum, both of which require no subsequent machining operations. The upper and lower disconnect halves 430 and 420, respectively, may also be conveniently formed of cast aluminum to include the lugs 432 and 422 with the ramps 433 and 419, respectively.

Referring to FIG. 9, the quick disconnect assembly 400 further includes a face type seal 468, which comprises a U-shaped cup seal 470 positioned in an annular groove 472 in the lower disconnect portion 420. The U-shaped cup 470 seal exerts a sealing force on the upper disconnect half 430 and the lower disconnect half 420 which increases in relation to the fluid pressure within the nozzle 30. The U-shaped cup seal 470 is preferably injection molded of specially compounded polyurethane elastomer of 60 shore A hardness to minimize rotational friction.

A fuel filter screen 410 may be mounted in the upper disconnect half 430 as shown in FIG. 9. The fuel filter screen may conveniently be of a conical configuration with a base 411 being sealingly mounted to the upper disconnect half 430 by a ring 413 and a seal, such as an O-ring 415.

FIG. 17 illustrates the direct connection of a pipe elbow 500 to the regulator housing 300 without the quick disconnect assembly 400. The swivel joint 172 comprises a ball race 173 and a plurality of ball bearings 165 rotatably to mount the pipe elbow 500 to the regulator housing 300. Sealing means such as the O-ring 340 controls leakage around the mating faces of the pipe elbow 500 and the regulator housing 300.

Referring to FIGS. 9 and 10, the pressure regulator 300 includes a sleeve valve 303 connected to a regulator piston 310 by a plurality of webs 312. The regulator piston 310 is movable in a cylinder 304 formed in a piston housing 305. A piston spring 320 has a first end mounted in the piston housing 305 and a second end positioned within a recess 307 in the regulator piston 310. A vent 315 vents the recess 307 to ambient air pressure so that only the piston spring 320 and the fuel pressure cause substantial forces on the regulator piston 310. The piston spring 320 positions the regulator piston 310 to place the sleeve valve 303 in a bore 308 in the outlet end of the nozzle body 32. The webs 312 are positioned in the sleeve valve 303 so that the connecting link 90 and the eccentric link 80 nest within the sleeve valve 303 when the nozzle poppet valve 100 is in the closed position, which advantageously permits the length of the valve body 32 to be shorter than previous designs permit.

Support means, such as a pair of webs 309 and 311, support the piston housing 305 within the regulator housing 302. The piston housing 305 includes a cavity 313 which the vent 315 through the web 309 maintains at ambient pressure.

Under normal operating conditions, fuel flows through the filter screen 410 past the webs 309 and 311 of the piston housing and past the webs 312 of the sleeve valve 303 into the nozzle body 32. If excessive pressure develops in the nozzle body 32, fluid pressure on the regulator piston 310 forces the regulator piston 310 against the piston spring 320 into the cavity 307 to decrease the distance between the sleeve valve 303 and the piston housing 305, thereby decreasing the rate of fuel flow into the nozzle 30. If the pressure inside the nozzle 30 attains a sufficiently high value, the regulator piston 310 moves into the recess 307 a distance sufficient to bring the sleeve valve 303 into contact with an O-ring 326 which a seal retainer 324 retains upon the piston housing 305. The seal retainer 324 also retains a seal 322, which maintains a seal between the regulator piston 310 and the piston housing 305. After the sleeve valve 303 sealingly engages the O-ring 326, no additional fuel flows into the nozzle 30. A seal 314, similar to the seal 470, is positioned in a groove 316 in the regulator housing 302 to prevent fuel leakage around the interface between the sleeve valve 303 and the inner wall of the regulator housing 302.

As the fuel pressure decreases within the nozzle body 32, the piston spring 320 moves the regulator piston 310 out of the cavity 307 to increase the distance between the sleeve valve 303 and the piston housing 313, thereby increasing the rate of fuel flow into the nozzle 30. Therefore, the pressure regulator 300 responds to pressure fluctuations in the nozzle body 32 by adjusting the fuel flow rate to regulate the pressure within the nozzle body 30.

The piston spring 320 is preferably made of a cryogenically treated stainless steel or a shot peened carbon steel, both of which permit the piston spring 320 to be shorter in length than would otherwise be possible.

The pressure regulator 300 may further include a spring biased check valve 328 positioned in a passage 329, which extends through the piston housing 305 to provide fluid communication between the inlet of the nozzle 30 and the fuel hose (not shown). The check value 328 includes a ball 330 which a spring 332 biases within the passage 329. Excessive fuel pressure in the nozzle 30 pushes the ball 330 against the bias of the spring 332 to permit fuel to flow through the passage 332 until the fuel pressure in the nozzle returns to a predetermined safe level.

Figure 19:
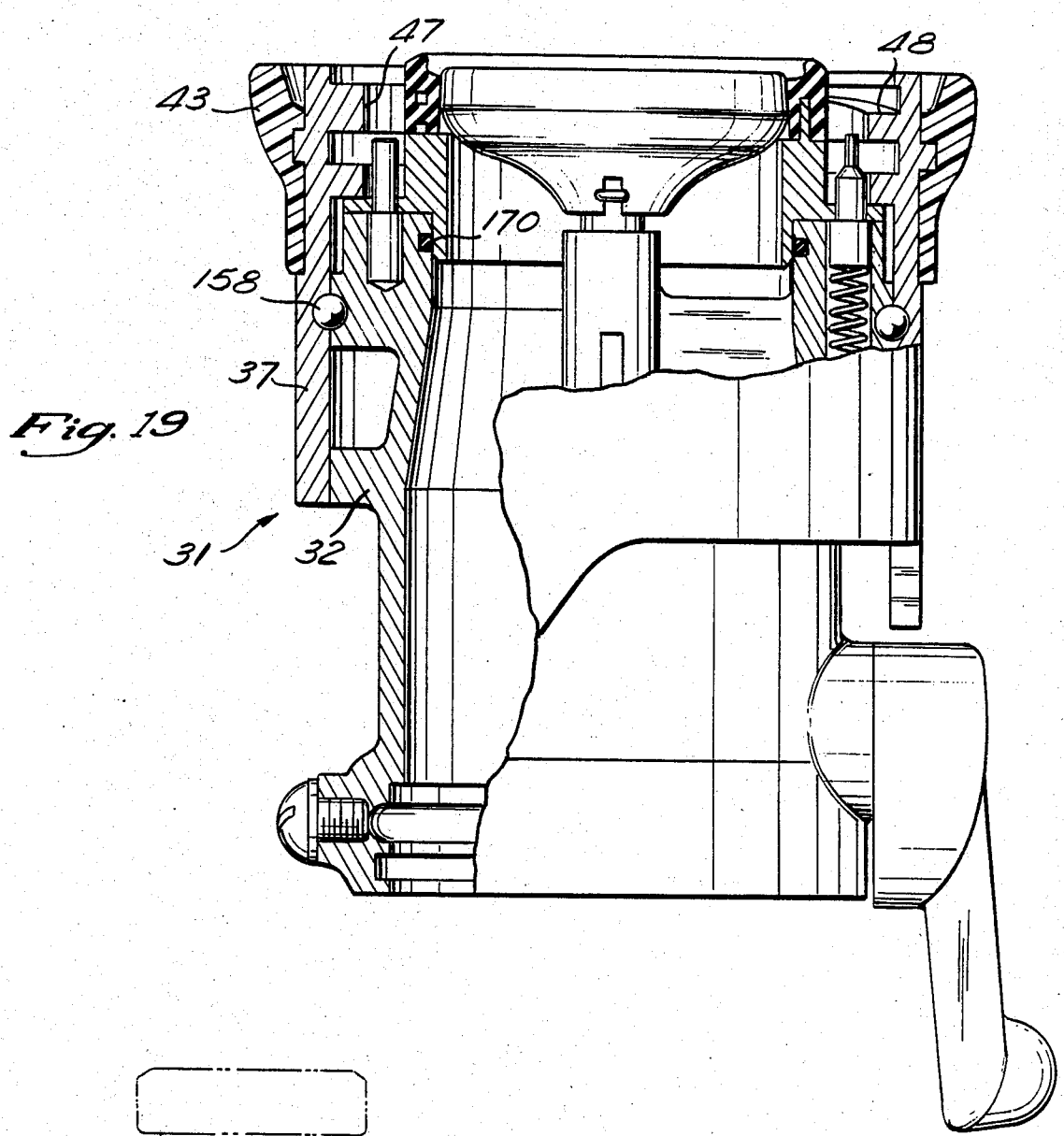
FIG. 19 is a partial cross-sectional view of an alternate embodiment of the invention without a mechanical fuse.

FIG. 19 illustrates an embodiment of the nozzle 31 which does not include the mechanical fuse 86 shown in FIGS. 3, 8 and 14–16. The nozzle 31 of FIG. 19 includes the same nozzle body 32 as does the nozzle 30 described with reference to FIGS. 1–18. The nozzle 31 includes a nozzle collar 37 which is rotatably mounted to the nozzle body 32. The ball bearings 158 facilitate rotation of the nozzle collar 37 relative to the nozzle body 32. The nozzle collar 37 includes shelves 47 and 48 similar to the shelves 150, 152 and 154 for attaching the nozzle collar 37 to the aircraft adapter 200 of FIG. 13.

A nozzle collar bumper 43 is mounted around the outside of the nozzle collar 37. The nozzle collar bumper 43 is preferably formed of a resilient material to provide means for absorbing forces applied to the nozzle 31 during use thereof.

Figure 18:
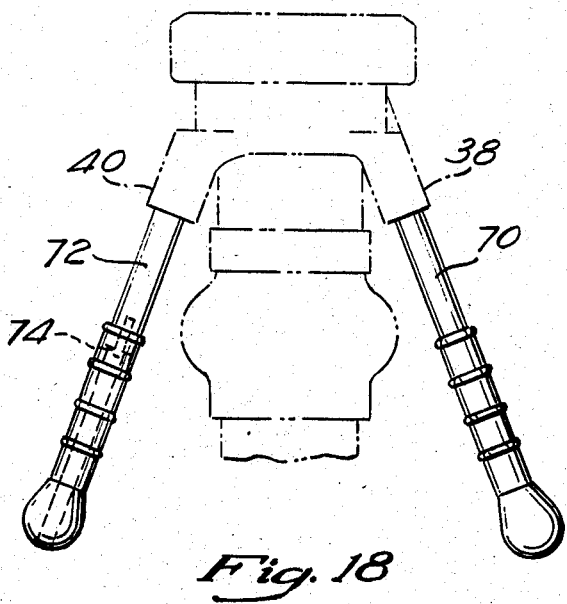
FIG. 18 is an elevation view which illustrate different modular handles which may be attached to the nozzle body.

FIG. 18 illustrates the modular concept of handle grip options, the wrought handles 70 and 72 are cast integral to the aluminum handle receivers 38 and 40 and are the same length. Either a long handle grip or a short handle grip may be installed in a modular fashion as shown and secured by a screw 74.

Figure 21:
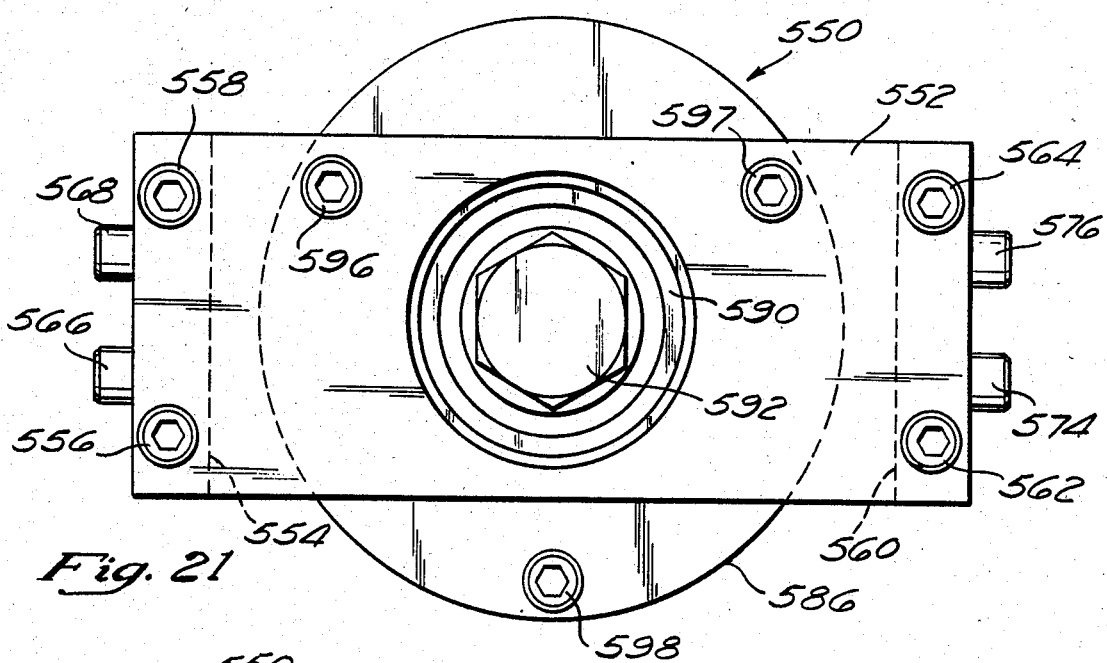
FIG. 21 is a plan view of the test fixture of FIG. 21.
Figure 20:
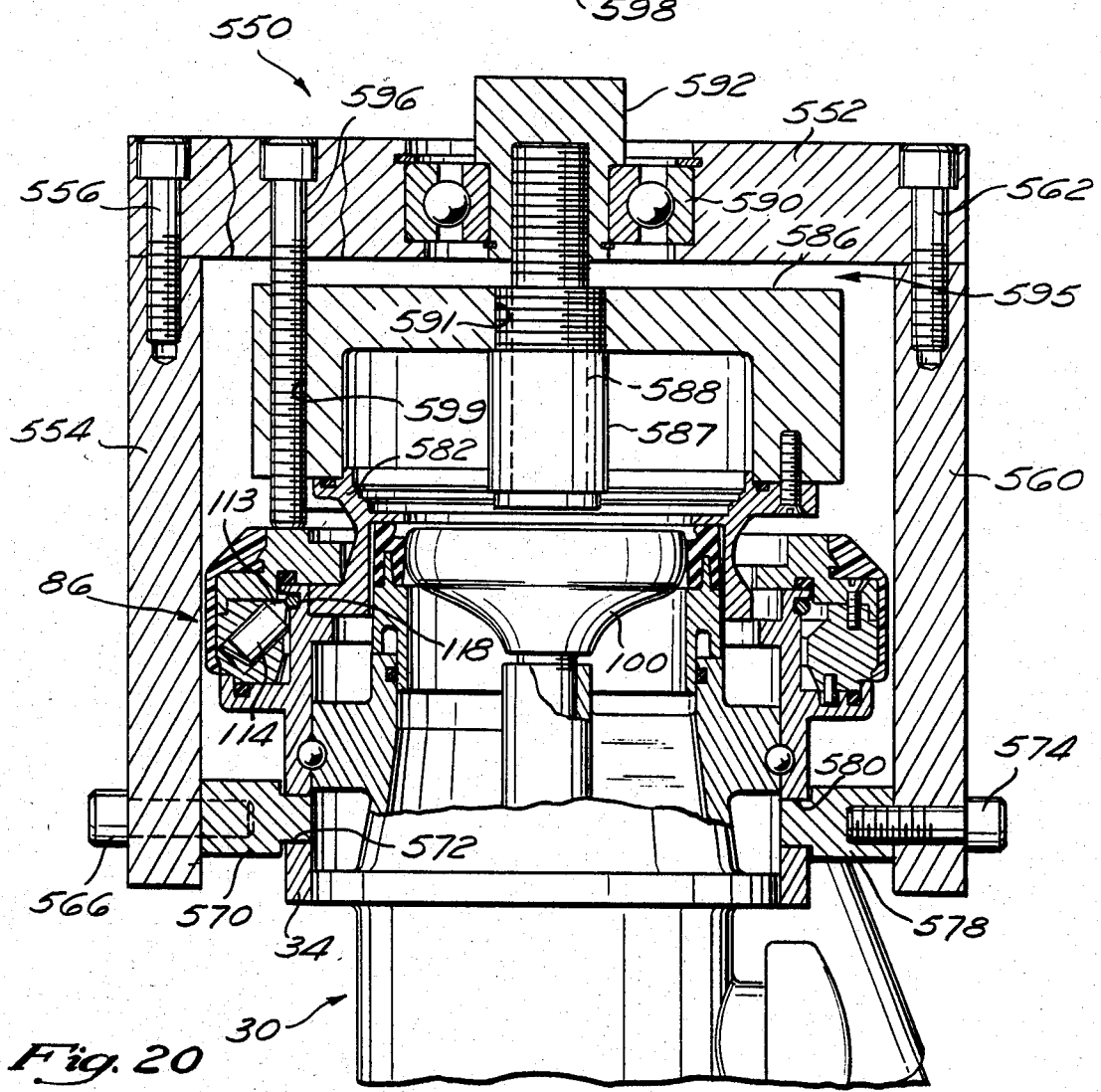
FIG. 20 is a cross-sectional view of a test fixture for testing break-away forces of an aircraft refueling nozzle according to the invention.

Referring to FIGS. 20 and 21, a test unit 550 for testing the mechanical fuse 86 includes an upper plate 552 mounted to a first support plate 554 by a pair of bolts 556 and 558 and mounted to a second support plate 560 by a pair of bolts 562 and 564. A pair of bolts 566 and 568 connects the support plate 554 to a lug 570 which engages a recess 572 in the nozzle collar 34. Similarly, a pair of bolts 574 and 576 connect the support plate 560 to a lug 578 which engages a recess 580 in the nozzle collar 34. Engagement of the lugs 570 and 578 in the recesses 572 and 580, respectively, retains the test unit 550 against axial movement and rotational movement relative to the nozzle 30 as the test unit 550 applies test forces to the mechanical fuse 86.

The test unit 550 further includes a test adapter 582 similar in configuration to the aircraft adapter 200 shown in FIG. 13 for locking engagement with the collar adapter 44. A spacer 586 is positioned between the test adapter 582 and the upper plate 552. A recirculating ball screw 588 extends through a ball bearing assembly 590 in the upper plate 552 and through a passage 591 in the spacer 586 for threaded engagement with a ball nut 587. The ball nut 587 is connected to the test adapter 582 through the spacer 586 so that rotation of the ball screw 588 controls the movement of the ball nut 587 and the test adapter 582 between the nozzle 30 and the upper plate 522.

A plurality of bolts 596–598 are slidable through the upper plate 552. The bolt 596 extends through a threaded passage 599 in the spacer 586. The bolts 597 and 598 extend through similar passages (not shown) with the spacer 586 also being threaded to the bolts 597 and 598. As shown in FIG. 21, the bolt 596 is adjustable and contacts the nozzle collar adapter 44 when the test unit 550 is connected to the nozzle 30.

A head 592 fixed to the recirculating ball screw 588 provides means for applying test forces to the mechanical fuse 86 through the recirculating ball screw 588 and the test adapter 582. Turning the head 592 with a calibrated torque wrench (not shown) urges the nozzle collar adapter 44 and the test adapter 582 away from the nozzle body 32 toward the upper plate 552 and permits reliable testing of the mechanical fuse 86. The gap 595 between the spacer 586 and the upper plate 552 limits the distance which the test adapter 582 may travel axially away from the nozzle collar 34 in response to test forces applied by the recirculating ball screw 588.

The chamfers 113 on the detents 114 allow the test unit 550 to move the detents 114 far enough to test the axial release force without causing complete separation of the nozzle collar 34 and the collar adapter 44. During the testing of the release force, it is generally desirable to avoid complete separation of the nozzle collar 34 and the collar adapter 44 to obviate the necessity of using the assembly fixture 602 to reassemble the mechanical fuse 86 after testing. Therefore, after the mechanical fuse 86 has been tested, the nozzle 30 may be placed in condition for use by rotating the recirculating ball screw 588 to force the detents 114 back over the wire 118 by means of force exerted through the bolts 596, 597 and 598.

What is claimed is:

1. A nozzle, comprising:
a nozzle body including an inlet end and an outlet end;
nozzle collar adapter means connectable to a fuel tank adapter; and
mechanical fuse means releasably connecting said nozzle collar adapter to said outlet end; and being released upon either axial or lateral loads exceeding respective predetermined amounts.

2. A nozzle according to claim 1 further comprising:
a nozzle collar mounted to said nozzle body, one of said nozzle collar or said nozzle collar adapter having an annular ring thereon;
a plurality of detents on the other of said nozzle collar or said nozzle collar adapter;
said mechanical fuse means including retainer means mounted on said annular ring, said detents in engagement with said retainer means for selectively maintaining a connection between said nozzle collar and said nozzle collar adapter; and
biasing means for controlling the force required to separate said nozzle collar adaptor from said nozzle collar.

3. A nozzle according to claim 2 further comprising biasing means for urging each of said detents against said retainer means.

4. A nozzle according to claim 1, further comprising:
a nozzle valve shaft bearing mounted inside said nozzle body, said nozzle valve bearing including a slot therein;
a nozzle valve shaft extending through said nozzle valve shaft bearing;
a nozzle valve connected to said nozzle shaft, said nozzle valve being sealingly engageable with said outlet end of said nozzle body; and
linkage means for controlling the axial position of said nozzle valve relative to said outlet end, said linkage means including a connecting link reciprocally movable within said slot as said nozzle valve moves axially relative to said outlet end.

5. A nozzle according to claim 4 wherein said linkage means includes:
an eccentric link connected to said connecting link; and
means for rotating said eccentric link to move said connecting link and said nozzle valve shaft within said nozzle valve shaft bearing to control the position of said nozzle valve.

6. A nozzle according to claim 5 further comprising:
a pressure regulator housing rotatably connected to said inlet end of said nozzle body, said pressure regulator having an inlet end and an outlet end;
a first ball race formed between adjacent surfaces of said inlet end of said nozzle body and said outlet end of said pressure regulator housing;
a plurality of ball bearings retained within said ball race; and
seal means for controlling leakage between the adjacent surfaces of said pressure regulator housing and said inlet end of said nozzle body.

7. A nozzle according to claim 6 further comprising:
a first disconnect half rotatably connected to the inlet end of said pressure regulator housing;
a second ball race formed between adjacent surfaces of said first disconnect half and said inlet end of said pressure regulator housing;
a second disconnect half demountably coupled to said first disconnect half; and
means for selectively maintaining the coupling between said first disconnect half and said second disconnect half.

8. A nozzle according to claim 7 further including:
a plurality of locking lugs extending radially outward from said first disconnect half;
a plurality of mating lugs extending radially inward from said second disconnect half, said locking lugs and said mating lugs being engagable to form a connection between said first and second disconnect halves upon insertion of said upper disconnect half inside said second disconnect half and rotation of said first disconnect half relative to said second disconnect half to place said locking lugs in alignment with said mating lugs; and
means for selectively engaging said locking lugs and said mating lugs to retain said first disconnect half against rotation relative to said lower disconnect half.

9. A nozzle according to claim 8 wherein said selectively engaging means comprises a castellated sleeve slidably mounted upon said first disconnect half, said castellated sleeve having a plurality of retaining lugs extending therefrom for engaging said locking lugs and said mating lugs.

10. A nozzle according to claim 9 further comprising a spring retained upon said lower disconnect half, said spring having a tang for engagement between said locking lugs to retain said upper disconnect half against rotation relative to said lower disconnect half.

11. A nozzle according to claim 10 further comprising:
 a plurality of indexing ribs extending radially outward from said first disconnect half, said castellated sleeve having a plurality of indexing slots therein, said indexing slots corresponding to said indexing ribs to retain said castellated sleeve against rotation relative to said first disconnect half; and
 spring means mounted to said first disconnect half for retaining said castellated sleeve against axial movement away from said locking lugs.

12. A nozzle according to claim 10 further comprising a pressure regulator mounted within said pressure regulator housing, said pressure regulator including a sleeve valve movable in said pressure regulator housing outlet end between an open position and a closed position for controlling fluid pressure in said inlet end of said nozzle body, said sleeve valve having a concave end, said linkage means nesting within said concave end of sleeve valve when said sleeve valve is open and said nozzle valve is closed.

13. A nozzle according to claim 1 further comprising:
 a pressure regulator housing rotatably coupled to said inlet end of said nozzle body, said pressure regulator having an inlet end and an outlet end;
 a first ball race formed between mating surfaces of said inlet end of said nozzle body and pressure regulator housing;
 a plurality of ball bearings retained within said ball race; and
 seal means for controlling leakage between mating surfaces of said pressure regulator housing and said inlet end of said nozzle body.

14. A nozzle according to claim 13 further comprising:
 an first disconnect half rotatably coupled to the inlet end of said pressure end regulator housing;
 a second ball race formed between mating surfaces of said first disconnect half and said inlet end of said pressure regulator housing;
 means for demountably coupling a second disconnect half to said upper disconnect half; and
 means for maintaining the coupling between said first disconnect half and said second disconnect half.

15. A nozzle according to claim 14 wherein said means for maintaining the coupling between said first and second disconnect halves includes:
 a plurality of locking lugs extending radially outward from said first disconnect half;
 a plurality of mating lugs extending radially inward from said second disconnect half, said locking lugs and said mating lugs being engageable to form a connection between said first and second disconnect halves upon insertion of said first disconnect half inside said second disconnect half and rotation of said first disconnect half relative to said second disconnect half to place said locking lugs in alignment with said mating lugs; and
 a castellated sleeve around said first disconnect half, said castellated sleeve having a plurality of retaining lugs extending therefrom, said castellated sleeve being slidable upon said first disconnect half for selective engagement of said retaining lugs with said locking lugs and said mating lugs to retain said first disconnect half against rotation relative to said lower disconnect half.

16. A nozzle according to claim 15 further comprising a spring retained upon said second disconnect half, said spring having a tang for engagement between said locking lugs to retain said upper disconnect half against rotation relative to said lower disconnect half.

17. A nozzle according to claim 16 further comprising:
 a plurality of indexing ribs extending radially outward from said first disconnect half, said castellated sleeve having a plurality of indexing slots therein, said indexing slots corresponding to said indexing ribs to retain said castellated sleeve against rotation relative to said first disconnect half; and
 spring means mounted to said first disconnect half for retaining said castellated sleeve against axial movement away from said locking lugs.

18. A nozzle, comprising:
 a nozzle body including an inlet end for admitting a fluid and an outlet end for emitting the fluid;
 a nozzle valve shaft bearing mounted inside said nozzle body, said nozzle valve shaft bearing including a slot therein;
 a nozzle valve shaft extending through said nozzle valve shaft bearing;
 a nozzle valve connected to said nozzle valve shaft for controlling the flow of fluids between said inlet end and said outlet end of said nozzle body; and
 linkage means for controlling the axial position of said nozzle valve shaft within said nozzle body, said linkage means including a connecting link reciprocally movable within said slot as said nozzle valve moves axially relative to said nozzle body.

19. A nozzle according to claim 18 wherein said linkage means includes:
 an eccentric link connected to said connecting link; and
 means for rotating said eccentric link to move said nozzle valve shaft within said nozzle valve shaft bearing to control the position of said nozzle valve.

20. A nozzle according to claim 19 further comprising a pressure regulator connected to said inlet end of said nozzle body; said pressure regulator including:
 a regulator housing;
 a regulator piston slidably mounted within said regulator housing between an open position and a closed position, said regulator piston having a concave end, said linkage means nesting within said concave end when said nozzle valve is closed;
 biasing means for urging said regulator piston toward the open position;
 a sleeve valve positioned within said regulator housing and connected to said regulator piston, said sleeve valve and said piston being movable in response to changes in fluid pressure in said nozzle body to control the flow rate of fluid through said regulator housing to control fluid pressure within said nozzle body; and sealing means for sealingly engaging said sleeve valve if the fluid pressure within said nozzle body exceeds a predetermined value.

21. A nozzle according to claim 20 wherein said piston housing has a passage therethrough to provide fluid communication between the inlet end and the outlet end of said pressure regulator and further including a check valve positioned within said passage and biasing means for biasing said check valve in a closed position, said check valve permitting fluid flow from said regulator outlet end to said regulator inlet end to maintain the fuel pressure in said nozzle below a predetermined value.

22. A nozzle comprising:
a nozzle body having an inlet end and an outlet end;
a first disconnect half connected to the inlet end of said nozzle body;
a plurality of locking lugs extending radially outward from said first disconnect half;
a second disconnect half having a plurality of mating lugs extending radially inward for locking engagement with said locking lugs, said locking lugs and said mating lugs coupling said first and second disconnect halves together when said locking lugs and said mating lugs are intermeshed and rotated into axial alignment; and
means for selectively engaging said locking lugs and said mating lugs to retain said first disconnect half and said second disconnect half against relative rotation, thereby selectively maintaining locking engagement of said locking lugs and said mating lugs.

23. A nozzle according to claim 22 wherein said selectively engaging means comprises a castellated sleeve slidably mounted upon said first disconnect half, said castellated sleeve having a plurality of retaining lugs extending therefrom for engaging said locking lugs and said mating lugs.

24. A nozzle according to claim 23 further comprising a spring retained upon said lower disconnect half, said spring having a tang for engagement between said locking lugs to retain said upper disconnect half against rotation relative to said lower disconnect half.

25. A nozzle according to claim 24 further comprising:
a plurality of indexing ribs extending radially outward from said upper disconnect half, said castellated sleeve having a plurality of indexing slots therein, said indexing slots corresponding to said indexing ribs to retain said castellated sleeve against rotation relative to said upper disconnect half; and
spring means mounted to said upper disconnect half for retaining said castellated sleeve against axial movement away from said locking lugs.

26. A nozzle according to claim 18 further comprising:
a first disconnect half rotatably connected to said inlet end of said nozzle body;
a plurality of locking lugs extending radially outward from said first disconnect half;
a second disconnect half demountably coupled to said first disconnect half;
a plurality of mating lugs extending radially inward from said second disconnect half, said locking lugs and said mating lugs being engageable to form a connection between said first and second disconnect halves upon insertion of said first disconnect half inside said second disconnect half and rotation of said first disconnect half relative to said second disconnect half to place said locking lugs in alignment with said mating lugs; and
means for selectively engaging said locking lugs and said mating lugs to retain said first disconnect half against rotation relative to said second disconnect half.

27. A nozzle according to claim 26 wherein said selectively engaging means comprises a castellated sleeve slidably mounted upon said first disconnected half, said castellated sleeve having a plurality of retaining lugs extending therefrom for engaging said locking lugs and said mating lugs.

28. A nozzle according to claim 27 further comprising a spring retained upon said second disconnect half, said spring having a tang for engagement between said locking lugs to retain said first disconnect half against rotation relative to said second disconnect half.

29. A nozzle according to claim 28 further comprising:
a plurality of indexing ribs extending radially outward from said first disconnect half, said castellated sleeve having a plurality of indexing slots therein, said indexing slots corresponding to said indexing ribs to retain said castellated sleeve against rotation relative to said first disconnect half; and
spring means mounted to said first disconnected half for retaining said castellated sleeve against axial movement away from said locking lugs.

30. A nozzle, comprising:
a nozzle body including an inlet end and an outlet end;
a housing rotatably connected to said inlet end of said nozzle body, said housing having an inlet end and an outlet end;
a first race formed between adjacent surfaces of said inlet end of said nozzle body and said outlet end of said housing;
a plurality of bearings retained within said race;
a disconnect half rotatably connected to the inlet end of said housing;
a second race formed between adjacent surfaces of said disconnect half and said inlet end of said housing; and
a plurality of bearings retained within said second race.

31. A nozzle according to claim 30 further comprising seal means for controlling leakage between adjacent surfaces of said outlet of said housing and said inlet end of said nozzle body.

32. A nozzle according to claim 30 further comprising seal means for controlling leakage between the adjacent surfaces of said disconnect half and said inlet end of said housing.

33. A nozzle according to claim 40 wherein said seal means for controlling leakage between the adjacent surfaces of said inlet end of said housing and said disconnect half includes:
a first O-ring mounted in said inlet end of said housing;
a second O-ring mounted in said disconnect half; and
a teflon slipper seal floatably mounted between said first and second O-rings.

34. A nozzle, comprising:
a nozzle body including an inlet end and an outlet end;

a pressure regulator housing having an inlet end and an outlet end, said outlet of said pressure regulator housing being coupled to said inlet end of said nozzle body;

a valve mounted in said pressure regulator housing, said valve being movable between an open position and a closed position in response to changes in fluid pressure in said nozzle body to control the flow rate of fluid through said regulator housing and to control the fluid pressure within said nozzle body;

means for urging said sleeve valve toward the open position with a predetermined force:

and means for moving said valve to the closed position when fluid pressure within said nozzle body exerts said predetermined force on said regulator piston.

35. A nozzle according to claim 34 wherein said valve is a sleeve valve and wherein said means for moving said valve to the closed position includes a piston connected to said valve, said piston being positioned within said pressure regulator housing to have an end exposed to fluid pressure within said nozzle body, said piston being reciprocally movable within a cavity in said pressure regulator housing.

36. A nozzle according to claim 35 wherein said pressure regulator housing has a vent therein for maintaining said cavity at ambient air pressure.

37. A nozzle according to claim 35 further including means for permitting fluid flow from said outlet end of said pressure regulator housing to said inlet end of said pressure regulator housing in response to fluid pressure greater than a predetermined valve in said outlet end of said pressure regulator housing.

38. A nozzle according to claim 1 wherein said mechanical fuse includes:
a nozzle collar mounted to said nozzle body, said nozzle collar having an annular ring therein;
a wire mounted in said annular ring;
a detent ring placed around said nozzle collar, said detent ring having a plurality of cavities therein;
a plurality of detents mounted within said detent ring such that one of said detents is mounted in each of said plurality of cavities, each of said detents having an end engaged with said wire to retain said detent ring and said nozzle collar adapter means upon said nozzle collar, said ends of said detents being movable over said wire in response to predetermined forces, each of said plurality of detents having a chamfered surface adjacent said end for sliding engagement with said wire after disengagement of said end from said wire.

39. A nozzle according to claim 1 wherein said nozzle is configured for connection to an aircraft fuel tank having an aircraft adapter connected thereto and an aircraft fuel tank valve mounted therein, the aircraft fuel tank valve being biased to a normally closed position, further comprising:
a nozzle valve mounted inside said nozzle body, said nozzle valve being reciprocally movable between an open position and a closed position; and
means for moving said nozzle valve between the open and closed positions thereof, said nozzle valve being aligned with said aircraft fuel tank valve when said nozzle is connected to said aircraft fuel tank adapter, said nozzle valve opening said aircraft fuel tank valve as said nozzle valve moves toward said open position and retaining said aircraft fuel tank valve in the open position for supplying fuel to said aircraft fuel tank, said nozzle valve being withdrawn from said aircraft fuel tank valve in response to release of said mechanical fuse to permit said aircraft fuel tank valve to return to the closed position thereof to limit fuel spillage from said aircraft fuel tank.

40. A nozzle according to claim 5, further including a crank shaft connected to said eccentric link, said crank shaft including a crank operating handle formed as a single piece therewith.

41. A nozzle according to claim 1, further comprising:
a first disconnect half rotatably connected to the inlet end of said nozzle body;
a second disconnect half demountably coupled to said first disconnect half; and
means for selectively maintaining the coupling between said first disconnect half and said second disconnect half.

42. A nozzle according to claim 41, further comprising:
a pressure regulator housing having an inlet end and an outlet end, said outlet of said pressure regulator housing being coupled to said inlet end of said nozzle body;
a valve mounted in said pressure regulator housing, said valve being moveable between an open position and a closed position in response to changes in fluid pressure in said nozzle body to control the flow rate of fluid through said regulator housing and to control the fluid pressure within said nozzle body;
means for urging said sleeve valve toward the open position with a predetermined force; and
means for moving said valve to the closed position when fluid pressure within said nozzle body exerts said predetermined force on said regulator piston.

43. A nozzle according to claim 1, further comprising:
a pressure regulator housing having an inlet end and an outlet end, said outlet of said pressure regulator housing being coupled to said inlet end of said nozzle body;
a valve mounted in said pressure regulator housing, said valve being moveable between an open position and a closed position in response to changes in fluid pressure in said nozzle body to control the flow rate of fluid through said regulator housing and to control the fluid pressure within said nozzle body;
means for urging said sleeve valve toward the open position with a predetermined force; and
means for moving said valve to the closed position when fluid pressure within said nozzle body exerts said predetermined force on said regulator piston.

44. A nozzle according to claim 4, further comprising:
a pressure regulator housing having an inlet end and an outlet end, said outlet of said pressure regulator housing being coupled to said inlet end of said nozzle body;
a valve mounted in said pressure regulator housing, said valve being moveable between an open position and a closed position in response to changes in fluid pressure in said nozzle body to control the flow rate of fluid through said regulator housing and to control the fluid pressure within said nozzle body;

means for urging said sleeve valve toward the open position with a predetermined force; and means for moving said valve to the closed position when fluid pressure within said nozzle body exerts said predetermined force on said regulator piston.

45. A nozzle according to claim 34, further comprising:
   a first disconnect half rotatably connected to the inlet end of said pressure regulator housing;
   a second disconnect half demountably coupled to said first disconnect half; and
   means for selectively maintaining the coupling to said first disconnect half and said second disconnect half.

46. A nozzle according to claim 45, further comprising:
   a nozzle valve shaft bearing mounted inside said nozzle body, said nozzle valve shaft bearing including a slot therein;
   a nozzle valve shaft extending through said nozzle valve shaft bearing;
   a nozzle valve connected to said nozzle shaft, said nozzle valve being sealingly engageable with said outlet end of said nozzle body; and
   linkage means for controlling the axial position of said nozzle valve relative to said outlet end, said linkage means including a connecting link reciprocally moveable within said slot as said nozzle valve moves axially relative to said outlet end.

47. A nozzle according to claim 4, further comprising:
   a first disconnect half rotatably connected to the inlet end of said nozzle body;
   a second disconnect half demountably coupled to said first disconnect half; and
   means for selectively maintaining the coupling between said first disconnect half and said second disconnect half.

* * * * *